United States Patent [19]

Sommargren

[11] Patent Number: 4,950,078

[45] Date of Patent: Aug. 21, 1990

[54] HIGH ACCURACY DIFFERENTIAL PLANE MIRROR INTERFEROMETER

[75] Inventor: Gary E. Sommargren, Santa Cruz, Calif.

[73] Assignee: Zygo Corporation, Middlefield, Conn.

[21] Appl. No.: 282,018

[22] Filed: Dec. 8, 1988

[51] Int. Cl.⁵ ............................................. G01B 9/02
[52] U.S. Cl. .................................. 356/349; 356/351; 356/358
[58] Field of Search .................. 356/349, 351, 358

[56] References Cited

U.S. PATENT DOCUMENTS 3,976,379  8/1976  Morokuma .................... 356/351
4,693,605  9/1987  Sommargren ............... 356/351 X Primary Examiner—Davis L. Willis
Assistant Examiner—Matthew W. Koren
Attorney, Agent, or Firm—Bryan, Cave, McPheeters & McRoberts

[57] ABSTRACT

A differential plane mirror interferometer system comprises a laser source (10) which emits an input beam (12) having two linear orthogonally polarized components, which may or may not be of the same optical frequency. A birefringent optical element (64) converts the input beam components (20,21) into two separated, parallel, orthogonally polarized beams (22,23). The birefringent element (64) together with a first quarter-wave phase retardation plate (66), a second quarter-wave phase retardation plate (62) with a pair of holes, and a retroreflector (60) with a pair of holes aligned with the holes in the second quarter-wave phase retardation plate (62), causes each of the separated, parallel, orthogonally polarized beams to be reflected twice by one of two plane mirrors (68,70), namely a first plane mirror (68) or a second plane mirror (70), respectively, to produce two separated, parallel, orthogonally polarized output beams (54, 55). The birefringent optical element (64) converts the two separated, parallel, orthogonally polarized outbeams (54, 55) into a single output beam (80) in which the phase difference between the two polarization components of the single output beam (80) is directly proportional to the optical path length between the two plane mirrors (b 68, 70). This phase difference is measured by passing the output beam (80) through a polarizer (81) which mixes the two orthogonally polarized components in beam (80) with the interference between these two components being detected by a photodector (83) which produces an electrical signal (85). An electronic module (80) extracts the phase variation from this signal (85).

35 Claims, 2 Drawing Sheets

HIGH ACCURACY DIFFERENTIAL PLANE MIRROR INTERFEROMETER

BACKGROUND OF INVENTION

1. Field of the Invention

The present invention relates to apparatus for the measurement of optical path length changes between two plane mirror surfaces. More particularly, the invention relates to optical apparatus which is useful for high accuracy displacement metrology using interferometry.

2. The Prior Art

An interferometer is a basic instrument for most high accuracy displacement measurements in dilatometry, material stability studies, the machine tool industry, and in the semiconductor fabrication industry. One type of interferometer representative of the current state-of-the-art is the differential plane mirror interferometer which measures the optical path length changes between two external mirrors and which is described in R. R. Baldwin and G. J. Siddall, "A double pass attachment for the linear and plane interferometer," Proc. SPIE, Vol. 480, pp. 78–83 (May 1984) and in commonly owned U.S. Pat. Nos. 4,693,605 and 4,752,133 issued Sept. 15, 1987 and Jun. 21, 1988, respectively.

A limit on the accuracy of a heterodyne interferometer is the periodic, i.e. cyclic, error caused by leakage of the frequency components in the beamsplitter, see for example, N. Bobroff, "Residual Errors in Laser Interferometry from Air Turbulence and Non Linearity," Applied Optics, Vol. 26, pp. 2676–2682 (Jul. 1987) and C. M. Sutton, "Non-Linearity in Length Measurement Using Heterodyne Laser Michelson Interferometry," J. Phys. E: Sci. Intrum. Vol. 20, pp. 1290–1292 (1987).

For differential plane mirror interferometers of the prior art, the magnitude of this cyclic error ranges from ±1 to ±10 nanometers.

The present invention retains the basic plane mirror interferometer cavity of the prior-art differential plane mirror interferometer; however, the means used in the instant invention to produce the reference and measurement beams reduces the magnitude of the cyclic error by 2-3 orders of magnitude, i.e., to ±0.001–0.01 nanometer. The improvements of the present invention thusly increase the accuracy which can be attained with this type of interferometer.

SUMMARY OF THE INVENTION

In accordance with the instant invention, I provide a differential plane mirror interferometer system capable of measuring either changes in length or changes in optical length between two plane mirror surfaces comprising: a source of an input beam with two linear orthogonally polarized components which may or may not be of the same optical frequency, means, most preferably a birefringent optical element for converting said input beam into two separated, parallel, orthogonally polarized beams; a first plane mirror comprising one of the two plane mirror surfaces; a second plane mirror comprising the other of the two plane mirror surfaces; means, most preferably a first quarter-wave phase retardation plate, the birefringent optical element, a second quarter-wave phase retardation plate with a pair of holes, and a retroreflector with a pair of holes aligned with the holes in the second quarter-wave phase retardation plate for causing each of the separated, parallel, orthogonally polarized beams to be reflected twice by one of two plane mirrors, respectively, to produce two separated, parallel, orthogonally polarized output beams; means, most preferably the birefringent optical element, for converting the two separated, parallel, orthogonally polarized output beams into a single output beam in which the phase difference between the two polorization components of the single output beam is directly proportional to the optical path length between the two plane mirrors; means, most preferably a polarizer, for mixing the orthogonal components of the single output beam; means, most preferably a photoelectric detector, for producing an electrical measurement signal, and means to extract the phase difference from the electrical measurement signal, the extracted phase difference being proportional to the optical path length changes between the two plane mirrors.

THE DRAWINGS

FIG. 1 depicts in schematic form one embodiment of the instant invention where, for clarity, the figure is divided into parts (a) and (b) which show the beams in two different planes; and FIG. 2 depicts in schematic form the same embodiment as in FIG. 1, except in perspective view.

DETAILED DESCRIPTION OF THE INVENTION

Figure 1:
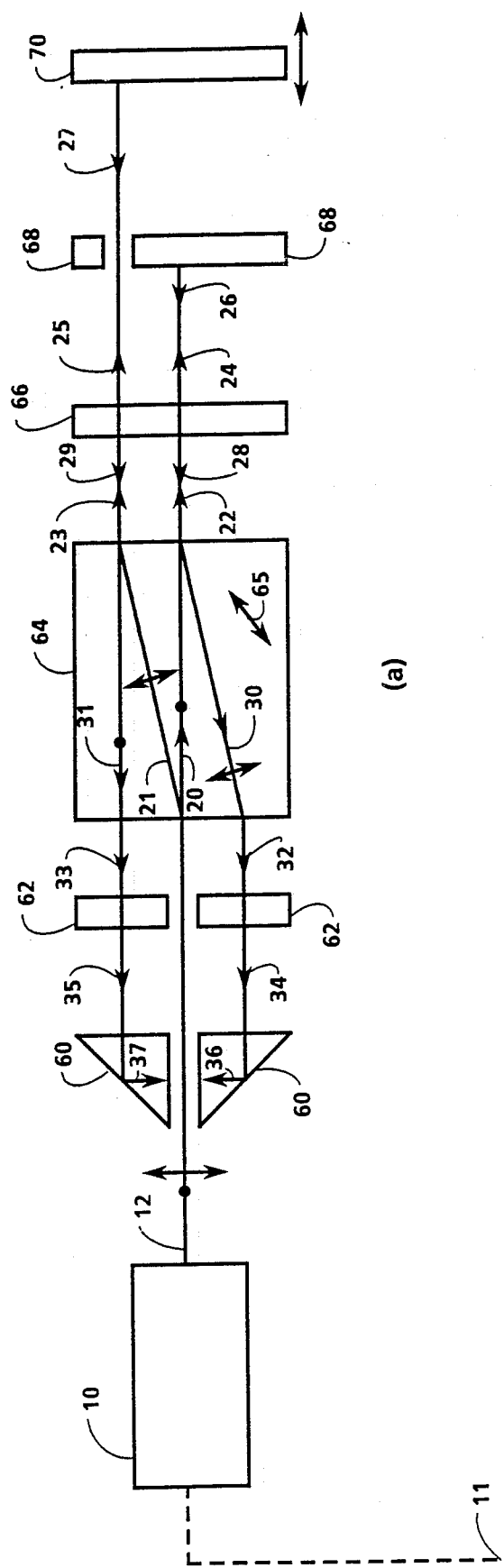
Figure 1:
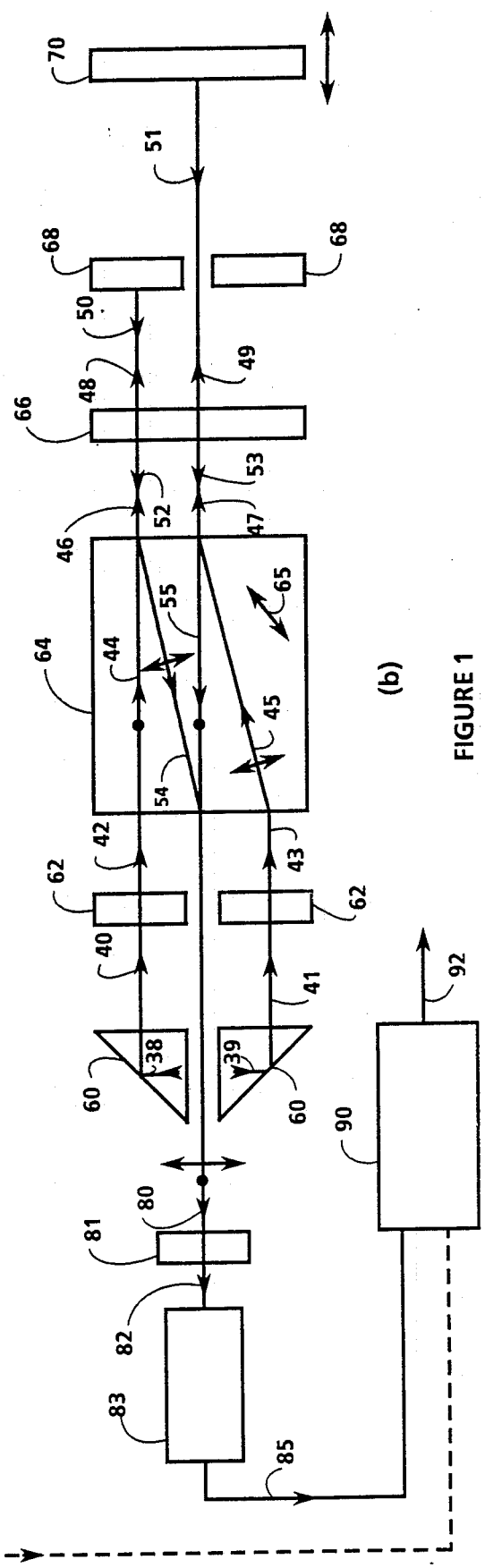

FIG. 1 depicts, in schematic form, one embodiment of the instant invention. Because the optical beams lie in two distinct planes, the figure is divided into parts (a) and (b). While the apparatus has application for a wide range of radiation sources, the following description is taken by way of example with respect to an optical measuring system. In part (a), light source (10), which most preferably uses a frequency stabilized laser, emits input beam (12) which is comprised of two linear, orthogonally polarized components as indicated by the dot and arrow, which may or may not be of the same optical frequency. If the frequencies are the same, see for example, Downs, et al., U.S. Pat. No. 4,360,271, issued Nov. 23, 1982. If the frequencies are different, see for example, Bagley, et al., U.S. Pat. No. 3,458,259, issued Jul. 26, 1969 and commonly owned U.S. Pat. No. 4,688,940 issued Aug. 25, 1987, in which source (10) would provide an electrical reference signal (11), shown by the dotted lines, which would correspond to the frequency difference between the two stabilized frequencies. No such reference signal (11) is provided when the two orthogonally polarized components comprising input beam (12) are of the same frequency.

Beam (12) passes through holes in retroreflector (60) and quarter-wave phase retardation plate (62) and is incident on crystal (64). Crystal (64) is birefringent (e.g., quartz or calcite) with optical axis (65). The component of polarization perpendicular to the figure (indicated by the dot) is transmitted as beam (20) whereas the component of polarization parallel to the figure (indicated by the arrow) is transmitted at a slight angle as beam (21). Beam (20) leaves crystal (64) as beam (22). Beam (21) leaves crystal (64) as beam (23) which is now parallel to beam (22). Beams (22) and (23) pass through quarter-wave phase retardation plate (66) and are converted into circularly polarized beams (24) and (25), respectively. Beam (24) is reflected from stationary reference plane mirror (68) as beam (26) while beam (25) is reflected from movable plane mirror (70), affixed to the stage (not shown) whose relative position is being measured, as beam (27). Beams (26) and (27) pass through quarter-wave phase retardation plate (66) and are converted back into linearly polarized beams (28) and (29), respectively, which are orthogonally polarized to beams (22) and (23), respectively. Beam (29) is directly transmitted by crystal (64) as beam (31), while beam (28) is transmitted by crystal (64) at a slight angle as beam (30). Beam (31) leaves crystal (64) as beam (33). Beam (30) leaves crystal (64) as beam (32). Beams (32) and (33) pass through quarter-wave phase retardation plate (62) and are converted into circularly polarized beams (34) and (35), respectively. Beams (34) and (35) enter retroreflector (60) and are reflected as beams (36) and (37), respectively. Beams (36) and (37) travel through retroreflector (60) taking them to diametrically opposite positions as beams (38) and (39), respectively, as shown in part (b) of the figure.

Beams (38) and (39) emerge from retroreflector (60) as beams (40) and (41), respectively. Beams (40) and (41) pass back through quarter-wave phase retardation plate (62) and are converted back into linearly polarized beams (42) and (43), respectively. Beam (42) is directly transmitted by crystal (64) as beam (44) while beam (43) is transmitted by crystal (64) at a slight angle as beam (45). Beam (44) leaves crystal (64) as beam (46). Beam (45) leaves crystal (64) as beam (47). Beams (46) and (47) pass through quarter-wave retardation plate (66) and are converted into circularly polarized beams (48) and (49), respectively. Beam (48) is reflected from stationary reference plane mirror (68) as beam (50) while beam (49) is reflected from movable plane mirror (70) as beam (51). Beams (50) and (51) pass back through quarter-wave phase retardation plate (66) and are converted back into linearly polarized beams (52) and (53), respectively, which are orthogonally polarized to beams (46) and (47), respectively. Beam (53) is directly transmitted by crystal (64) as beam (55) while beam (52) is transmitted by crystal (64) at a slight angle as beam (54). Beams (54) and (55) are recombined as beam (80) as they leave crystal (64). Beam (80) passes through the hole in quarter-wave phase retardation plate (62) and retroreflector (60).

Beam (80) like input beam (12), has two orthogonally polarized components. Each component has transversed exactly the same optical path length (through air, glass and crystal) except for the optical path between plane mirrors (68) and (70). This optical path length results in a phase difference between the two polarization components of beam (80). Motion of movable plane mirror (70), in the direction indicated by the arrow, causes this phase difference to vary. This phase variation is directly proportional to the distance moved by plane mirror (70) and is measured by passing beam (80) through polarizer (81), oriented at 45° to each polarization component, which mixes the two orthogonally polarized components in beam (80) to give beam (82).

The interference between the two polarization components is detected by photodetector (83) producing electrical signal (85). Electronic module (90) extracts the phase variation from electrical signal (85). When the two polarization components of beam (12) are of the same optical frequency, module (90) does not require a reference signal (11) since there is no corresponding frequency difference, and conventionally extracts the phase variation from signal (85) such as in the manner described in U.S. Pat. No. 4,360,271. However, when the two polarization components of beam (12) are of different frequencies, an additional sinusoidal electrical reference signal (11) equal in frequency to the difference between the two optical frequencies is preferably required by electronic module (90), which reference signal (11), as previously mentioned, would be provided from source (10) in which instance photodetector (83) would detect the interference between the two frequency components as a sinusoidal intensity variation with a frequency approximately equal to the difference frequency between the two components of beam (12), and module (90) would preferably comprise a phase meter/accumulator such as described in the aforementioned U.S. Pat. No. 4,688,940. In either event, electronic module (90) provides output (92) which is directly proportional to the change in optical path length between stationary reference plane mirror (68) and movable plane mirror (70), thus providing a measurement of optical path length change between the two plane mirror surfaces (68, 70).

This optical configuration reduces measurement errors, due to polarization mixing between the reference and measurement beams within the interferometer, by several orders of magnitude because crystal (64) has superior polarization characteristics as compared to those of a polarization beamsplitter typically used in displacement interferometers. Furthermore, this optical configuration is extremely insensitive to measurement error because changes in the other optical components, such as those induced mechanically or thermally, affect both polarization components equally and therefore have no influence on the measured phase variation (92).

Figure 2:
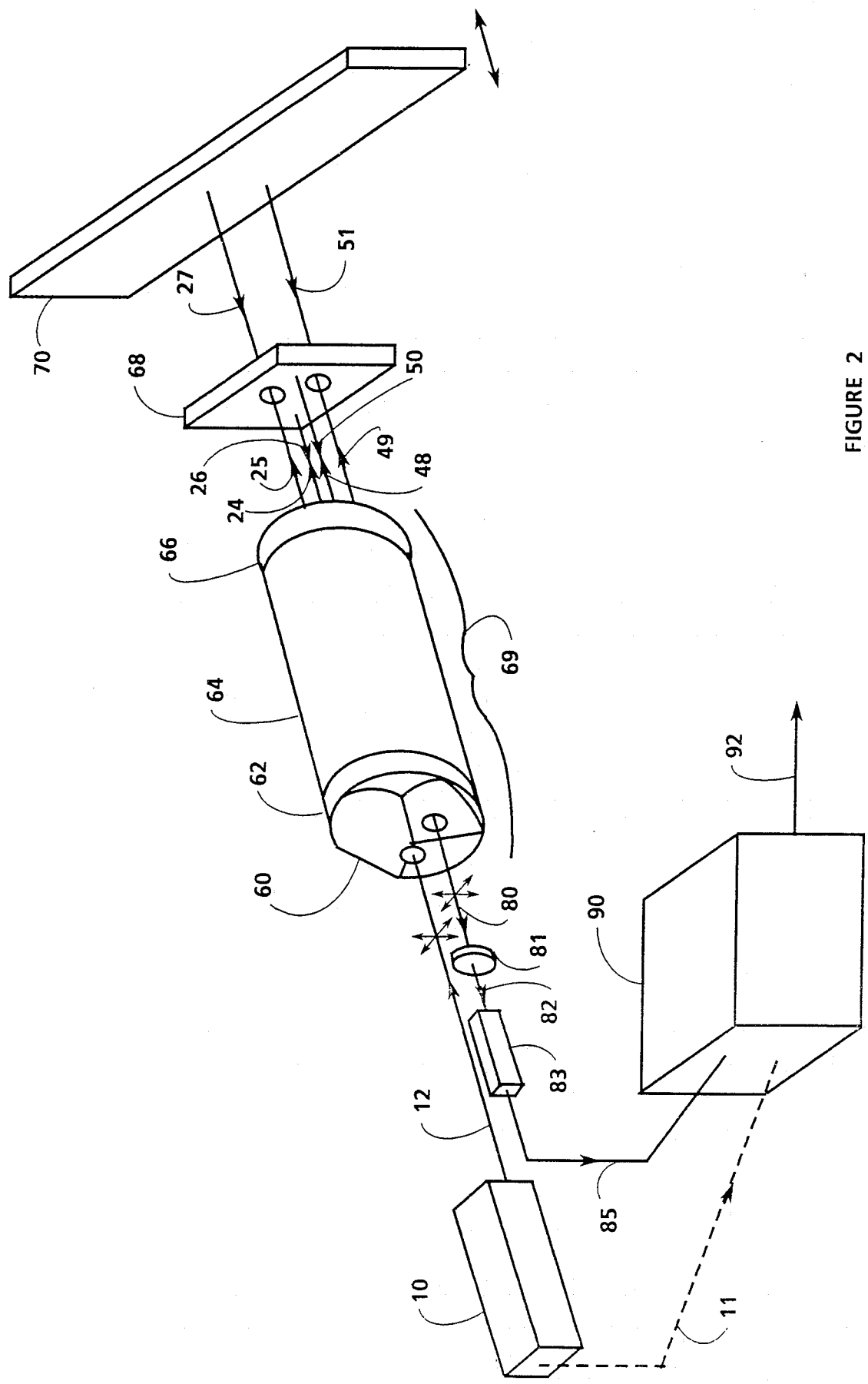

FIG. 2 depicts in schematic form the same embodiment of the instant invention, except shown in perspective view. Light source (10) emits beam (12) which is comprised of two linear, orthogonally polarized components as indicated by the two arrows, which may or may not be of the same optical frequency. Beam (12) enters interferometer body (69) which consist of retroflector (60), quarter-wave phase retardation plates (62) and (66) and crystal (64). As described in detail in FIG. 1, beams (24) and (25) emerge and are reflected from stationary reference mirror (68) and movable plane mirror (70), respectively, as beam (26) and (27) respectively. Beams (26) and (27) re-enter interferometer body (69) and, as described previously, emerge as beams (48) and (49). Beam (48) and (49) are reflected from stationary reference plane mirror (68) and movable plane mirror (70), respectively, as beams (50) and (51), respectively. Beams (50) and (51) re-enter interferometer body (69) and, as described previously, are combined and emerge as beam (80).

Beam (80), like input beam (12), has two orthogonally polarized components. Each component has transversed exactly the same optical path length (through air, glass, and crystal) except for the optical path between plane mirrors (68) and (70). This optical path length results in a phase difference between the two polarization components of beam (80). Motion of movable plane mirror (70), in the direction indicated by the arrow, causes this phase difference to vary. This phase variation is directly proportional to the distance moved by plane mirror (70) and is measured by passing beam (80) through polarizer (81), oriented at 45° to each polarization component, which mixes the two orthogonally polarized components in beam (80) to give beam (82).

The inteference between the two polarization components is detected by photodetector (83) producing electrical signal (85). Electronic module (90) extracts the phase variation from electrical signal (85). When the two polarization components of beam (12) are of the same optical frequency, module (90) does not require reference signal (11) since there is no corresponding frequency difference, and conventionally extracts the phase variation from signal (85) such as in the manner described in U.S. Pat. No. 4,360,271. However, when the two polarization components of beam (12) are of different frequencies, an additional sinusoidal electrical reference signal (11) equal in frequency to the difference between the two optical frequencies is preferably required by electronic module (90), which reference signal (11) as previously mentioned, would be provided from source (10) in which instance photodetector (83) would detect the interference between the two frequency components as a sinusoidal intensity variation with a frequency approximately equal to the difference frequency between the two components of beam (12), and module (90) would preferably comprise a phase meter/accumulator such as described in the aforementioned U.S. Pat. No. 4,688,940. In either event, electronic module (90) provides output (92) which is directly proportional to the charge in optical path length between stationary reference plane mirror (68) and movable plane mirror (70).

The principal advantage of the instant invention is: (1) significantly reduced cyclic non-linearity errors.

While a preferred embodiment of the invention has been disclosed, obviously modification can be made therein, without departing from the scope of the invention as defined in the following claims.

What is claimed is:

1. A differential plane mirror interferometer system capable of measuring changes in length or changes in optical length between two plane mirror surfaces in said system, said system comprising a source of an input beam with two linear orthogonally polarized components; means including a birefringent optical element, optically aligned with said input beam for converting said input beam into two, separated, parallel orthogonally polarized beams; a stationary reference plane mirror comprising one of said two plane mirror surfaces; a movable plane mirror comprising the other of said two plane mirror surfaces; means, including a corner-cube retroreflector, for causing each of said separated, parallel, orthogonally polarized beams to be reflected twice by one of said two plane mirrors, respectively, for producing two separated, parallel, orthogonally polarized output beams; means optically aligned with said two output beams for converting said two, separated, parallel orthogonally polarized output beams into a single output beam having two orthogonal polarization components having a phase difference there between, with said phase difference between said two orthogonal polarization components of said single output beam being directly proportional to the optical path length between said two plane mirrors; means optically aligned with said single output beam for mixing said orthogonal polarization components of said single output beam; means associated with said single output beam for providing an electric measurement signal therefrom; and means for extracting said phase difference between said orthogonal components of said single output beam from said electrical measurement signal, said extracted phase difference being proportional to said optical path length between said two plane mirrors; whereby said changes in length or optical length between said two plane mirror surfaces may be measured with significantly reduced cyclic non-linearity errors.

2. An interferometer system in accordance with claim 1 wherein said input beam source comprises a frequency stabilized laser.

3. An interferometer system in accordance with claim 2 wherein said linear orthogonally polarized components of said input beam source are of the same optical frequency.

4. An interferometer system in accordance with claim 2 wherein said linear orthogonally polarized components of said input beam source are of the different optical frequency.

5. An interferometer system in accordance with claim 1 wherein said linear orthogonally polarized components of said input beam source are of the same optical frequency.

6. An interferometer system in accordance with claim 1 wherein said linear orthogonally polarized components of said input beam source are of the different optical frequency.

7. An interferometer system in accordance with claim 1 wherein said means for causing each of said separated, parallel, orthogonally polarized beams to be reflected twice by one of said two plane mirrors to produce said two separated, parallel, orthogonally polarized output beams comprises a first quarter-wave phase retardation plate, said birefringent optical element, a second quarter-wave phase retardation plate with a pair of holes, and a retroreflector with a pair of holes aligned with said holes in said second quarter-wave phase retardation plate.

8. An interferometer system in accordance with claim 7 wherein said input beam source comprises a frequency stabilized laser.

9. An interferometer system in accordance with claim 8 wherein said linear orthogonally polarized components of said input beam source are of the same optical frequency.

10. An interferometer system in accordance with claim 8 wherein said linear orthogonally polarized components of said input beam source are of the different optical frequency.

11. An interferometer system in accordance with claim 7 wherein said linear orthogonally polarized components of said input beam source are of the same optical frequency.

12. An interferometer system in accordance with claim 7 wherein said linear orthogonally polarized components of said input beam source are of the different optical frequency.

13. An interferometer system in accordance with claim 1 wherein said birefringent optical element further comprises said means for converting said two separated, parallel, orthogonally polarized output beams into said single output beam.

14. An interferometer system in accordance with claim 13 wherein said input beam source comprises a frequency stabilized laser.

15. An interferometer system in accordance with claim 1 wherein said means for mixing said orthogonal components of said single output beam comprises a polarizer.

16. An interferometer system in accordance with claim 15 wherein said input beam source comprises a frequency stabilizer laser.

17. An interferometer system in accordance with claim 16 wherein said linear orthogonally polarized components of said input beam source are of the same optical frequency.

18. An interferometer system in accordance with claim 16 wherein said linear orthogonally polarized components of said input beam source are of the different optical frequency.

19. An interferometer system in accordance with claim 15 wherein said linear orthogonally polarized components of said input beam source are of the same optical frequency.

20. Am interferometer system in accordance with claim 15 wherein said linear orthogonally polarized components of said input beam source are of the different optical frequency.

21. An interferometer system in accordance with claim 1 wherein said means for producing said electrical measurement signal comprises a photoelectric detector.

22. An interferometer system in accordance with claim 21 wherein said input beam source comprises a frequency stabilized laser.

23. An interferometer system in accordance with claim 22 wherein said linear orthogonally polarized components of said input beam source are of the same optical frequency.

24. An interferometer system in accordance with claim 22 wherein said linear orthogonally polarized components of said input beam source are of the different optical frequency.

25. An interferometer system in accordance with claim 21 wherein said linear orthogonally polarized components of said input beam source are of the same optical frequency.

26. An interferometer system in accordance with claim 21 wherein said linear orthogonally polarized components of said input beam source are of the different optical frequency.

27. An interferometer system in accordance with claim 1 wherein said means for extracting said phase difference from said electrical measurement signal comprises a phase meter/accumulator.

28. An interferometer system in accordance with claim 27 wherein said input beam source comprises a frequency stabilized laser.

29. An interferometer system in accordance with claim 28 wherein said linear orthogonally polarized components of said input beam source are of the different optical frequency.

30. An interferometer system in accordance with claim 27 wherein said linear orthogonally polarized components of said input beam source are of the different optical frequency.

31. An interferometer system in accordance with claim 1 wherein said means for extracting said phase difference from said electrical measurement signal comprises a phase meter/accumulator.

32. An interferometer system in accordance with claim 31 wherein said input beam source comprises a frequency stabilized laser.

33. An interferometer system in accordance with claim 32 wherein said linear orthogonally polarized components of said input beam source are of the different optical frequency.

34. An interferometer system in accordance with claim 31 wherein said linear orthogonally polarized components of said input beam source are of the different optical frequency.

35. A differential plane mirror interferometer system capable of measuring changes in length or changes in optical length between two plane mirror surfaces in said system, said system comprising a source of an input beam with two linear orthogonally polarized components; means, including a birefringent optical element, optically aligned with said input beam for converting said input beam into two, separated, parallel orthogonally polarized beams; a first plane mirror comprising one of said two plane mirror surfaces; a second plane mirror comprising the other of said two plane mirror surfaces; means, including a corner-cube retroreflector, for causing each of said separated, parallel, orthogonally polarized beams to be reflected twice by one of said two plane mirrors, respectively, for producing two separated, parallel, orthogonally polarized output beams; means optically aligned with said two output beams for converting said two, separated, parallel orthogonally polarized output beams into a single output beam having two orthogonal polarization components having a phase difference there between, with said phase difference between said two orthogonal polarization components of said single output beam being directly proportional to the optical path length between said two plane mirrors; means optically aligned with said single output beam for mixing said orthogonal polarization components of said single output beam; means associated with said single output beam for providing an electric measurement signal therefrom; and means for extracting said phase difference between said orthogonal polarization components of said single output beam from said electrical measurement signal, said extracted phase difference being proportional to said optical path length between said two plane mirrors; whereby said changes in length or optical length between said two plane mirror surfaces may be measured with significantly reduced cyclic non-linearity errors.

* * * * *